May 9, 1950     C. E. CLAPPER     2,507,369
TRACTOR HITCH
Filed Feb. 10, 1947
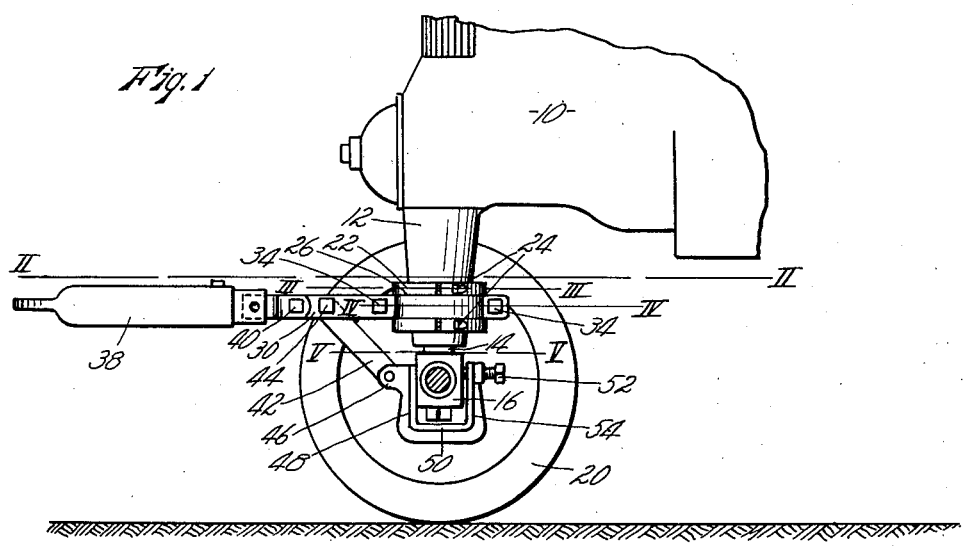
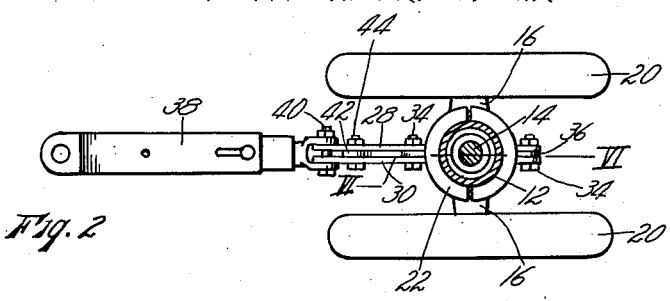
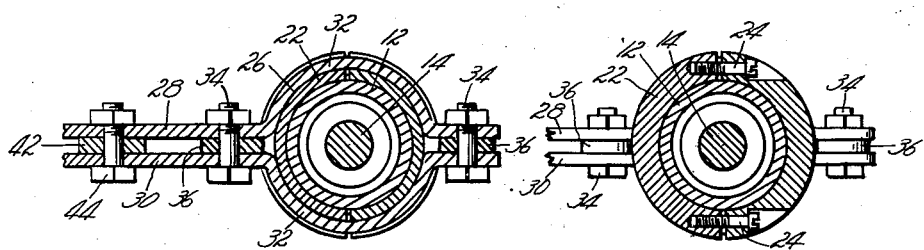
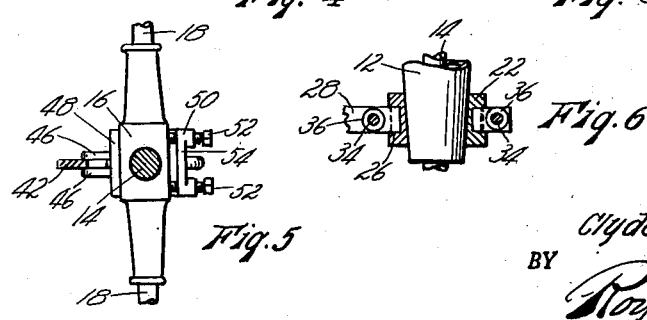
INVENTOR,
Clyde E. Clapper.
BY
Roy E. Hamilton,
Attorney.

UNITED STATES PATENT OFFICE 2,507,369

TRACTOR HITCH

Clyde E. Clapper, Kansas City, Mo.

Application February 10, 1947, Serial No. 727,661

2 Claims. (Cl. 280—33.5)

This invention relates to new and useful improvements in a tractor hitch, and has particular reference to a tractor hitch suitable for drawing a tractor and steering the tractor to follow the towing vehicle.

The principal object of the present invention is the provision of a tractor hitch adapted to be pivotally attached to a rigid part of a tractor, said hitch also being connected with the front axle of said tractor, whereby when said hitch is pivotally moved the front wheels of the tractor will be turned.

Another object is the provision of a tractor hitch adapted to be easily and rapidly mounted on or detached from the tractor.

Other objects are simplicity and economy of construction, ruggedness, dependability of operation, and adaptability to be attached to various makes of tractors without requiring material structural alteration.

With these objects in view, as well as other objects which will appear during the course of the specification, reference will be had to the drawing, wherein—

Figure 1 is a fragmentary side elevation of the forward portion of a tractor showing a tractor hitch embodying the present invention attached thereto.

Fig. 2 is a horizontal section taken on line II—II of Figure 1.

Fig. 3 is an enlarged fragmentary horizontal section taken on line III—III of Figure 1.

Fig. 4 is an enlarged fragmentary horizontal section taken on line IV—IV of Figure 1.

Fig. 5 is a fragmentary horizontal section taken on line V—V of Figure 1.

Fig. 6 is a fragmentary vertical section taken on line VI—VI of Figure 2.

Like reference numerals refer to similar parts throughout the several views, and the numeral 10 refers to a tractor having a downwardly projecting tubular housing 12 adjacent the forward end of the frame thereof. Said housing may be an integral part of the tractor frame or may be rigidly attached thereto. A vertical steering shaft 14 is carried rotatably in said housing and extends beneath said housing.

To the lower end of shaft 14 is rigily fixed an axle 16, and from said axle extend two lateral spindles 18 on each of which is rotatably mounted a ground-engaging wheel 20. The axis of said spindles intersects the axis of steering shaft 14.

A split ring 22 is carried on tubular housing 12 intermediate the ends thereof, the halves of said split ring being urged into clamping contact with said housing by means of screws 24. A groove 26 is formed in the peripheral surface of said ring. Two pulling members 28 and 30 each have a substantially semi-circular portion 32 adapted to be contained in said groove. Said pulling members are firmly joined on either side of housing 12 by means of bolts 34, and are maintained in spaced apart relationship by washers 36 carried on said bolts between said pulling members. Semi-circular portions 32 of said pulling members fit snugly but slidably in groove 26, thereby permitting pivotal movement of said pulling members about housing 12 concentric with shaft 14.

A drawbar 38 is pivotally connected to the forwardly extend ends of pulling members 28 and 30 by means of bolt 40. Said drawbar may be of any suitable type, and is adapted to be connected at its forward end to any vehicle suitable for pulling the tractor.

A link 42 is pivotally connected at its upper end between pulling members 28 at a point intermediate bolt 40 and housing 12 by means of bolt 44, and is pivotally connected at its lower end between lugs 46 of arm 48 of C-clamp 50. Said clamp is removably fixed to axle 16 by means of set screws 52 carried in arm 54 of said clamp.

Thus it is apparent that whenever a vehicle pulling tractor 10 by means of drawbar 38 turns, pulling members 28 and 30 will be caused to pivot in groove 26 of split ring 22. Link 42, being secured against pivotal movement in the plane of rotation of said pulling members by its projection between said pulling members and between lugs 46, thereby turn C-clamp 50, and axle 16 about the axis of shaft 14. Spindles 18 carried by said axle, and wheels 20 carried by said spindles, are thereby caused to turn to steer the tractor to follow the towing vehicle.

A feature of the invention is that the hitch, while connected to and turning the front axle of the tractor, exerts the principal portion of its pull on the tractor frame, thus avoiding possible damage to the axle or steering gear which might be caused by heavy loads or sudden jerks on said axle.

Another feature is the ease with which the hitch may be mounted on and detached from a tractor, and its adaptability to fit in any of the common makes of tractors without material structural change.

The improvements I claim as new and desire to protect by Letters Patent are:

1. The combination, with a tractor having a vertical steering shaft housing forming a rigid portion of the frame of said tractor, a steering shaft extending through said housing, and a substantially horizontal wheel carrying axle rigidly fixed to the lower end of said shaft, the axis of said axle intersecting the axis of said shaft, of a tractor hitch comprising a pulling member attached to said housing for pivotal movement relative thereto in a horizontal plane and concentric with said steering shaft, a clamp rigidly and removably fixed to the central portion of said axle, and a link connecting said clamp and said pulling member, said link being secured against any pivotal movement in a horizontal plane, whereby when said pulling member is pivoted about said housing said clamp and axle are caused to turn about the axis of said vertical steering shaft to steer said tractor.

2. The combination, with a tractor having a vertical steering shaft housing forming a rigid portion of the frame of said tractor, a steering shaft extending through said housing, a substantially horizontal axle rigidly attached to the lower end of said shaft, the axis of said axle intersecting the axis of said shaft, and spindles extending laterally from said axle for carrying the front wheels of said tractor, of a tractor hitch comprising a split ring bearing block clamped rigidly in said shaft housing, said ring having a groove formed in the periphery thereof, a pulling member carried in said groove for pivotal movement concentric with said steering shaft and extending forwardly from said shaft housing, a clamp removably secured to said axle, and a link connecting said pulling member and said clamp, said link being secured against any pivoting in a horizontal plane, whereby when said pulling member is pivoted about said shaft housing, said clamp turns said axle about the axis of rotation of said steering shaft to steer said tractor.

CLYDE E. CLAPPER.

REFERENCES CITED

The following references are of record in the file of this patent:

UNITED STATES PATENTS

| Number | Name | Date |
|---|---|---|
| 2,268,064 | Straus | Dec. 30, 1941 |